United States Patent
Marvin et al.

(10) Patent No.: US 9,379,585 B2
(45) Date of Patent: Jun. 28, 2016

(54) WINDING CONSTRUCTION FOR HIGH EFFICIENCY MACHINE

(71) Applicant: LCDrives Corp., Goshen, CT (US)

(72) Inventors: Russel H. Marvin, Goshen, CT (US); Thomas Johnson, Guilford, CT (US)

(73) Assignee: LCDRIVES CORP., Goshen, CT (US)

(*) Notice: Subject to any disclaimer, the term of this patent is extended or adjusted under 35 U.S.C. 154(b) by 375 days.

(21) Appl. No.: 13/670,429

(22) Filed: Nov. 6, 2012

(65) Prior Publication Data

US 2014/0125167 A1 May 8, 2014

(51) Int. Cl.
*H02K 3/12* (2006.01)
*H02K 3/18* (2006.01)
*H02K 3/24* (2006.01)
*H02K 15/04* (2006.01)

(52) U.S. Cl.
CPC .. *H02K 3/18* (2013.01); *H02K 3/24* (2013.01); *H02K 15/045* (2013.01); *Y10T 29/49009* (2015.01)

(58) Field of Classification Search
CPC ....................................................... H02K 3/28
USPC ............. 310/43, 214, 215, 216.119, 179–210
See application file for complete search history.

(56) References Cited

U.S. PATENT DOCUMENTS

| | | | | |
|---|---|---|---|---|
| 3,810,303 | A * | 5/1974 | Hoell | 29/605 |
| 6,113,024 | A * | 9/2000 | Pittard et al. | 242/433 |
| 6,229,241 | B1 * | 5/2001 | Ishigami et al. | 310/208 |
| 6,509,665 | B1 * | 1/2003 | Nishiyama et al. | 310/215 |
| 8,186,039 | B2 * | 5/2012 | Kamakura et al. | 29/596 |
| 8,487,500 | B2 * | 7/2013 | Cullen et al. | 310/215 |
| 2003/0193256 | A1 * | 10/2003 | Liebermann | 310/194 |
| 2004/0021391 | A1 * | 2/2004 | Jones et al. | 310/208 |
| 2004/0100154 | A1 * | 5/2004 | Rahman et al. | 310/54 |
| 2005/0168075 | A1 * | 8/2005 | Reynolds et al. | 310/12 |
| 2005/0236921 | A1 * | 10/2005 | Yoneda et al. | 310/179 |
| 2008/0290979 | A1 * | 11/2008 | Suzuki et al. | 336/192 |
| 2011/0278980 | A1 * | 11/2011 | Hara et al. | 310/208 |

* cited by examiner

*Primary Examiner* — Naishadh Desai
(74) *Attorney, Agent, or Firm* — Tarolli, Sundheim, Covell & Tummino LLP

(57) ABSTRACT

A permanent magnet motor, generator or the like that is constructed with a concentrated winding and edge form wound stator coils. This achieves less eddy current losses in the windings as well as a much higher power density than conventional techniques.

30 Claims, 16 Drawing Sheets

WINDING CONSTRUCTION FOR HIGH EFFICIENCY MACHINE

BACKGROUND OF THE INVENTION

Rotary electric machines including electric motors, generators, and the like have employed various types of stator windings. The most common stator winding type is a distributed winding. One type of which is an integer-slot winding wherein the number of slots per pole per phase is an integer. An example of this is a 4 pole 12 slot, 3 phase motor. The number of slots per pole per phase is 1 and therefore an integer. These windings typically require some relatively complex end turns to wire them properly.

Another type of distributed winding is a fractional-slot winding. When the number of slots per pole per phase is a fraction greater than one, this is called a fractional-slot winding. This also has complicated end turns and has the disadvantage of being less efficient. It is sometimes used to smooth out torque ripple or for other specific applications.

Another type of winding is a concentrated winding when the number of slots per pole per phase is a fraction less than one. These can also be called a non-overlapping concentrated winding. They have the disadvantage of decreasing the inherent efficiency of the device, but make the end turns very simple and can facilitate other advantages. An example of a concentrated winding would be an 8 pole, 9 slot, 3 phase machine. The number of slots per pole per phase is 0.375 in this case. The fundamental power from this configuration is reduced by 5.5%. Concentrated windings can be single layer or double layer designs. Single layer designs have windings that are wound only on alternating stator teeth and only apply where there is an even number of stator slots/teeth. Double layer designs have coils wound on every stator tooth. In this configuration, there is a coil that surrounds each of the teeth on the stator and there are the same number of coils as slots. Further, each slot has half of one coil and half of another coil going through the slot and the end turns are very short. Ideally, the end turns can be as short as the width of the stator tooth.

Double layer concentrated windings have the advantage of being a simple coil wrapped around each tooth. For an external rotor configuration, and using relatively open slots, this allows simple assembly of coils. For the more typical internal rotor configuration, assembly is a bit trickier because even with relatively open slots, the opening is smaller than the slot. This is further complicated if the slot opening is made smaller for motor performance reasons. A typical method of mitigating this issue is to make the teeth separate to either be able to 1) wind the wire directly on the tooth or 2) slide the winding on from the outside. The first method is shown in U.S. Pat. No. 5,583,387 entitled STATOR OF DYNAMO-ELECTRIC MACHINE incorporated herein by reference. The second method is shown in U.S. Pat. No. 4,712,035 entitled SALIENT POLE CORE AND SALIENT POLE ELECTRONICALLY COMMUTATED MOTOR also incorporated herein by reference although it is shown as an external rotor configuration. Both methods are shown as conventional in U.S. Pat. No. 8,129,880 entitled CONCENTRATED WINDING MACHINE WITH MAGNETIC SLOT WEDGES, incorporated herein by reference. The challenge with any stator lamination design that has separate teeth is to secure the teeth structurally so they do not move or break. Even small movements of the teeth can cause acoustic noise. A second challenge is to configure the joint in such a way to not significantly disturb the magnetic flux traveling through the laminations. If the joint could be made with zero clearance this would not be a problem, but with real manufacturing tolerances and features required for attachment, this is a major consideration.

Rotary electric machines including electric motors, generators, and the like have employed various methods of constructing stator windings. Some methods are applicable to only certain types of stator windings.

One common method is random winding. This method can use rectangular or round wire, but typically uses round wire. Here the windings are placed by the winding machine with the only requirement that they be located in the correct slot. This is the easiest method of stator winding, but results in the lowest amount of conductor in the slot and therefore the lowest efficiency. This type method can be used with any type of stator winding including concentrated windings.

Another common method is traditional form winding. This method typically uses rectangular wire with mica tape located between conductors to separate any conductors that are significantly different in voltage. This insures a robust winding for higher voltage machines or machines that are prone to partial discharge. This is the most labor-intensive type of winding and is typically used in machines that are less cost sensitive. This type method can be used with any type of stator winding but is typically used for distributed windings.

One winding type that is not typical in motors, is used in certain types of transformers, chokes, and inductors is bobbin layer winding. This type of winding places conductors in exact locations for very accurate stacking of wires. This can achieve a high amount of conductors in a small area for high efficiency. This is not typically used for distributed windings because you are not able to bobbin wind a coil and then insert it into a stator assembly. This is possible with concentrated windings that have removable teeth. The most common wire to use is round wire but it is possible to use square or rectangular wire. Layer winding with rectangular wire is typically laid flat and wound the easy way. This facilitates simpler winding, but one disadvantage of this is the eddy current losses due to slot leakage can be significantly higher. Also, orientation of the rectangular wire can have an impact on thermal performance and depends on the overall heat removal scheme.

Layer winding with rectangular wire can be done edge wound (wound the hard way.) This is shown in U.S. Pat. No. 4,446,393 entitled DYNAMOELECTRIC FIELD ASSEMBLY AND WINDING THEREFOR incorporated herein by reference. In this patent a single layer of rectangular wire is used in each slot and is edge wound. This patent used removable teeth and an internal rotor. U.S. patent application serial number 2010/0066198 filed Mar. 18, 2010 entitled INSERTION OF PRE-FABRICATED CONCENTRATED WINDINGS INTO STATOR SLOTS incorporated herein by reference also shows a single layer of rectangular wire but does not use removable teeth. Edge wound coils can have significantly lower eddy current losses in the wires. The cooling may be better or worse depending on the overall cooling scheme.

Rotary electric machines including electric motors, generators, and the like have employed various cooling methods including air cooling and liquid cooling. Liquid cooling is used to help make motors smaller and to remove the heat more efficiently.

The most common liquid cooling design uses a cooling jacket wrapped around the outside of the stator assembly. This can be seen in U.S. Pat. No. 5,448,118 entitled LIQUID COOLED MOTOR AND ITS JACKET, included herein by reference. In this design there is an aluminum extrusion that surrounds the outside of the stator and has passages for cooling fluid to pass through. This design cools the stator better than air, but is limited by i) the conductivity between the jacket and the stator, ii) the poor conductivity of the stator laminations, iii) the conductivity of the slot liners, and iv) the poor conductivity between the winding and the slot liners.

Another method that is commonly used is passing cooling through the stator laminations or into slots cut into the stator laminations. Either of these has similar disadvantages to the cooling jacket design.

Further, some techniques involve spraying fluid directly on the stator or submerging the stator. These have the disadvantage of either being overly complex or having the fluid cause drag between the rotor and the stator.

There are at least two techniques placing the cooling jacket through the winding slot. One of these is forcing fluid down the center of a conductor. Typically the fluid in this case is a non-conductive oil. This has the disadvantage of requiring a special fluid and some complex manufacturing methods to provide the fluid channel. Other techniques place a pipe or vessel down through the slot with cooling fluid in it. These typically also use non-conductive oil and have non-conductive connections to a manifold at their end. An example of this can be found in U.S. Pat. No. 3,112,415 entitled CONTROL OF WINDING TEMPERATURES OF LIQUID COOLED GENERATORS, incorporated herein by reference.

Novel methods of cooling are also shown in other applications filed by Marvin et al U.S. patent application Ser. No. 13/548,199 entitled LIQUID COOLED HIGH EFFICIENCY PERMANENT MAGNET MACHINE WITH GLYCOL COOLING, Ser. No. 13/548,203 entitled LIQUID COOLED HIGH EFFICIENCY PERMANENT MAGNET MACHINE WITH IN SLOT GLYCOL COOLING, Ser. No. 13/548,207 entitled HIGH EFFICIENCY PERMANENT MAGNET MACHINE WITH CONCENTRATED WINDING AND DOUBLE COILS, and Ser. No. 13/548,208 entitled HIGH EFFICIENCY PERMANENT MAGNET MACHINE WITH LAYER FORM WINDING all filed Jul. 13, 2012, all incorporated herein by reference.

SUMMARY OF THE INVENTION

The machine described herein incorporates several novel construction methods in its stator. It uses a concentrated winding with a novel approach to secure its removable teeth. This method insures metal on metal contact with real manufacturing tolerances. The preload caused by deflected steel insures that this metal on metal contact maintains itself in all loading conditions.

This design also uses Edge Form Wound windings which minimize eddy current losses in the windings. Further, the use of pre-insulated wire, novel cooling manifold location, and assembly loading insures a very good thermal solution that allows much higher current density in the slot. This higher current density in the slot allows significantly higher overall power density of the rotating machine particularly in larger machines and higher speed machines.

This edge winding solution needs a very sophisticated winding method to achieve accurate coils that can achieve high packing density and work reliably in demanding applications. The incorporation of a controlled winding approach using pre-insulated wire is unique. Pre-insulated wire has been used with simple pin-bending solutions, but this would not achieve the higher packing density or high yields in manufacturing. Further, in real applications, the wire size may need to get quite large to accommodate the correct number of turns. This wire may get larger than commonly available for pre-insulated wire and this larger wire will have more eddy current losses in the wire due to slot leakage magnetic flux. This design uses multiple in hand winding to solve these issues.

The machine described herein also includes novel in slot liquid cooling in a configuration that allows the use of conductive fluid such as ethylene glycol. This configuration places the cooling manifold between the winding and the stator laminations to give ideal cooling for the winding as well as the stator laminations.

Further, this design uses metallic vessels that contain the liquid cooling medium for high reliability. These metallic vessels are brazed together into manifolds to efficiently direct the liquid to where the heat is generated.

The combination of these approaches leads to a very reliable, small, efficient, and low cost design.

DESCRIPTION OF PREFERRED EMBODIMENT

Figure 1:
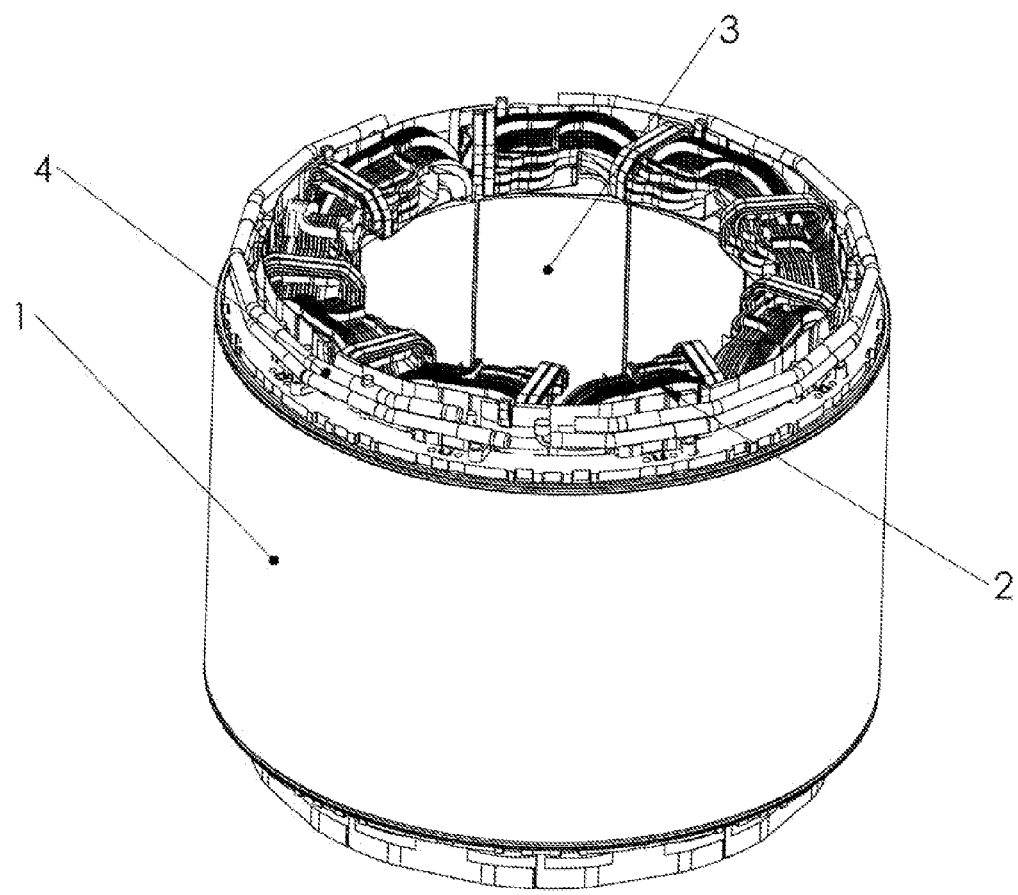
FIG. 1 is a three dimensional view of the stator assembly.

Referring particularly to FIG. 1, a stator assembly 1 is shown containing stator coils 2 and stator lamination teeth 3. Also shown is a fluid manifold 4 for supplying coolant to the motor or generator.

Figure 2:
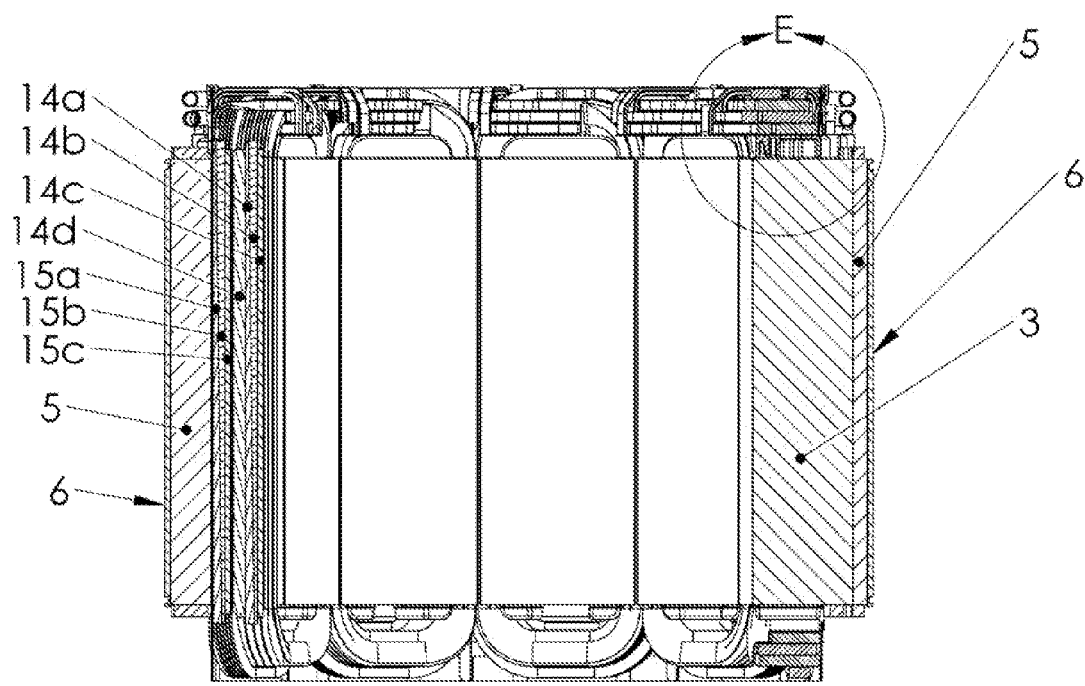
FIG. 2 is a cross sectional view of the stator assembly of FIG. 1.
Figure 3:
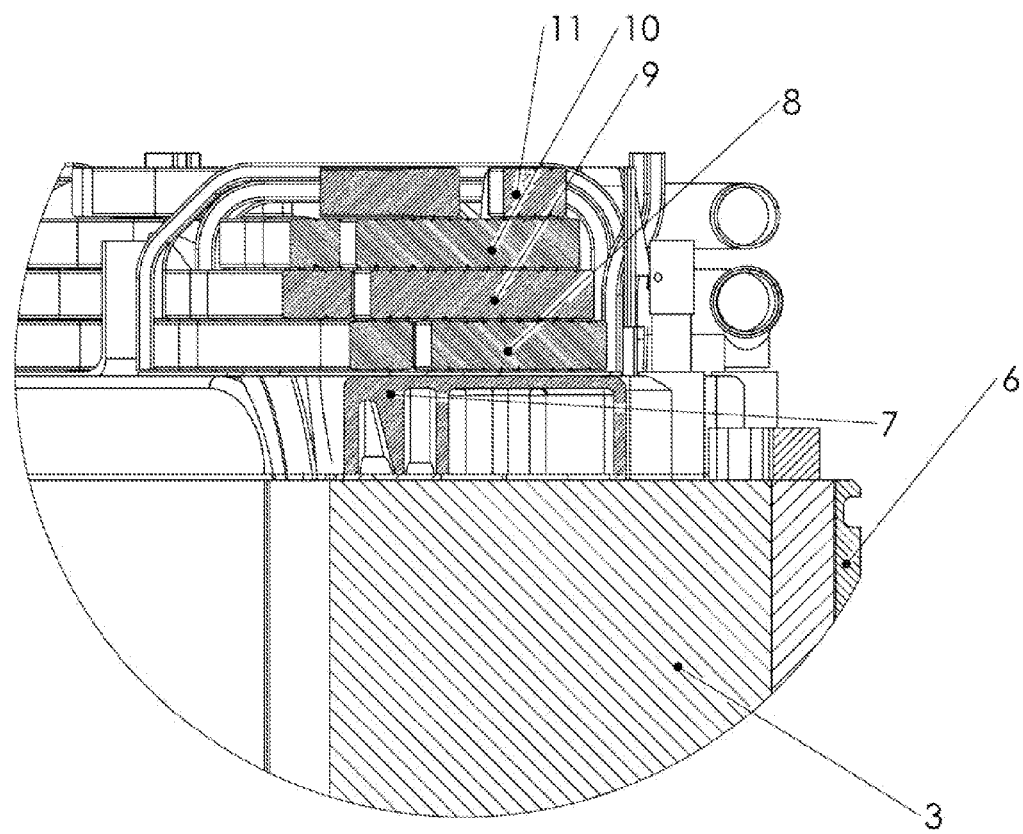
FIG. 3 is an enlarged detail sectional view of the stator assembly shown in FIG. 2.
Figure 4:
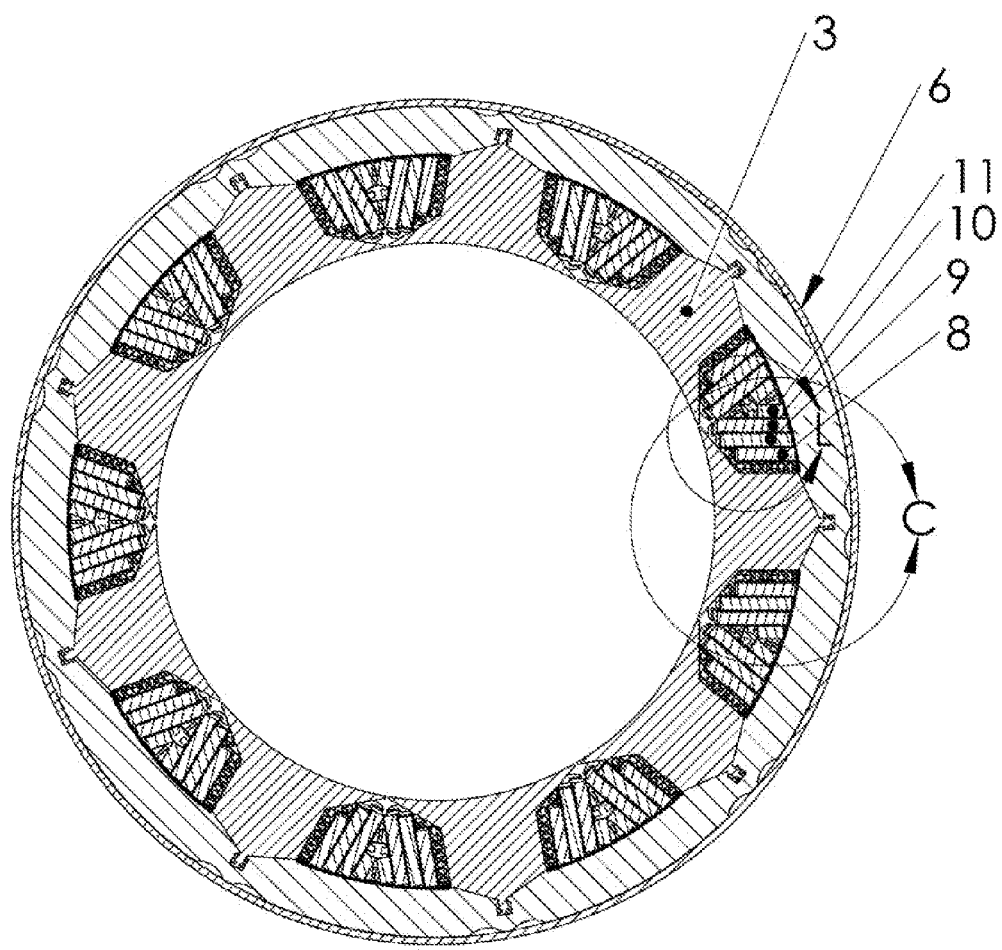
FIG. 4 is cross sectional view of the stator assembly.

FIG. 2 shows more detail on the stator assembly showing outer tube 6, outer laminations 5, and stator teeth 3. The stator shown in FIG. 2 has a double layer concentrated winding since there is a winding around every stator tooth. In addition, the stator winding is comprised of four portions: innermost layer 8, second layer 9, third layer 10, and fourth layer 11 as shown in FIG. 3. The four portions are separate and distinct from this being a double layer winding which refers to there being a winding around every stator tooth.

Figure 5:
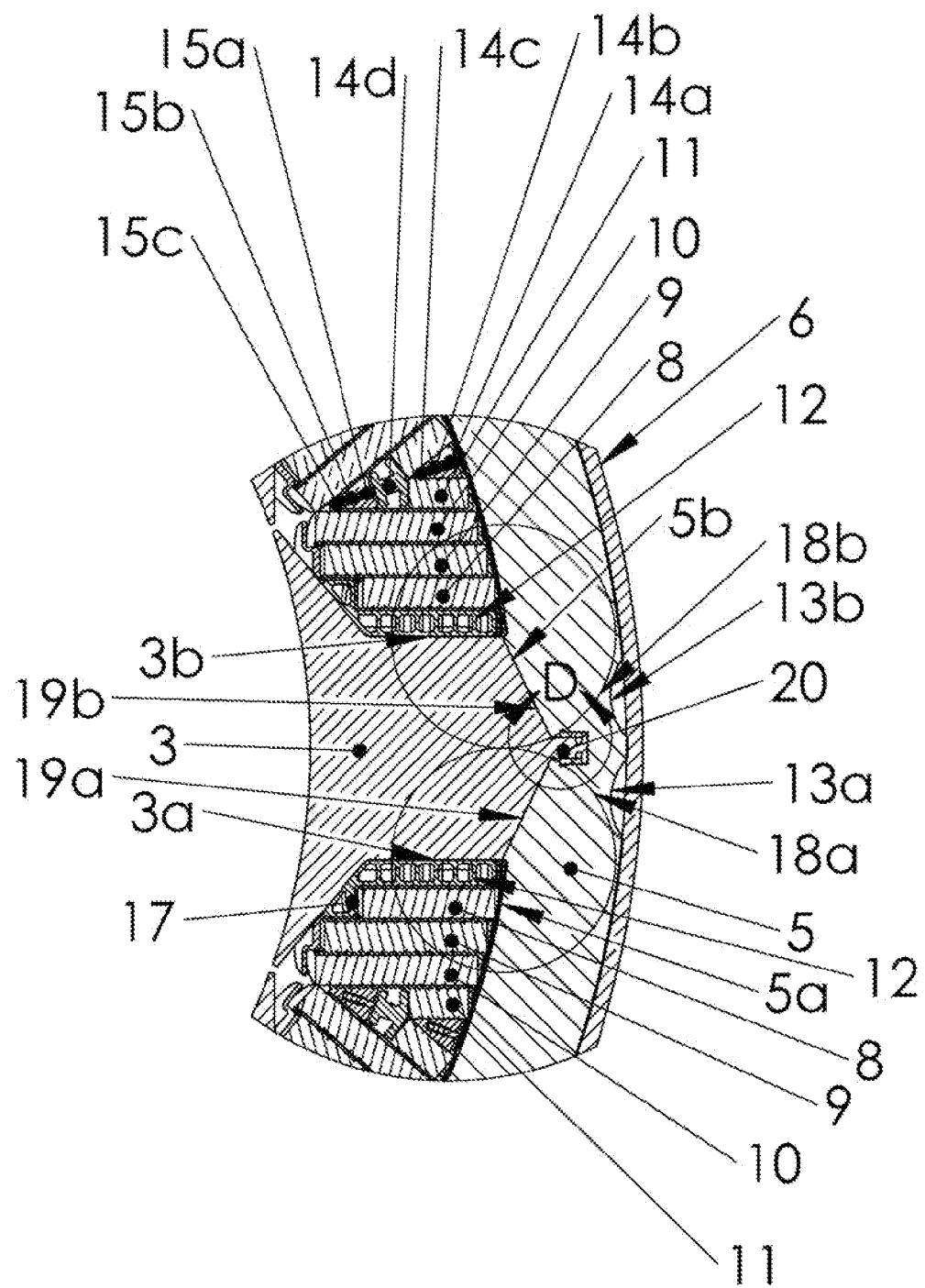
FIG. 5 is a detail view of the stator assembly shown in FIG. 4.

Each winding surrounds a cooling manifold with the upper portion 7 shown in FIG. 3 and the in slot portion 12 shown in FIG. 5. The cooling manifold is shown with 8 holes in each side. Since this is an even number it facilitates a single sided manifold where in slot cooling vessels are connected only on one end of the machine. Since the number of holes is divisible by four, it also facilitates making redundant cooling loops and a single sided manifold (two up and two down for each of the two redundant loops.) These coolant loops can be connected to their own pump and designed such that only one loop is necessary to keep the machine cool.

This flow path is desirable since there are no electrically conductive loops around stator teeth that are formed with the coolant. This is important because it allows the use of conductive fluids such as a water and ethylene glycol mixture without sacrificing any performance. Further, it allows the use of metals to hold cooling fluid with brazed or soldered joints without causing any shorting paths. While using soldering or brazing, a preferable method of adding filler material is either by using stamped foils inserted between components or by applying paste on one of the surfaces.

Having a soldered or brazed joint is important for the overall reliability of the system and is preferable to O-rings, hoses or other insulation systems. Fluid can pass through this passage in either direction but preferably is in a cross flow configuration. These can be manifolded from a single end and can be connected in parallel or in series. A parallel configuration is the preferred method due to reduced fluid pressure drop with smaller passages.

The in-slot cooling manifold 12 as shown in FIG. 5 can be configured with a step 17 to facilitate better cooling with edge wound coils. It is typical that the available space in the slot is not rectangular and has a more unique shape. By putting this step in the cooling manifold and making the height of the step equal to the thickness of the first layer, it allows a larger cooling surface without taking away from room for copper wire in the slot. The tooth 3 as best shown in FIG. 5 is designed as a separate piece from the rest of the stator lamination. This is done to allow the cooling manifolds and windings to be installed on the tooth before insertion into the stator. This is desirable in many concentrated winding designs but is particularly important on this design because the teeth 3 are designed to have a very small gap from each other. Further when using edge wound coils it is much easier to install with a straight in insertion that does not require deformation.

Figure 6:
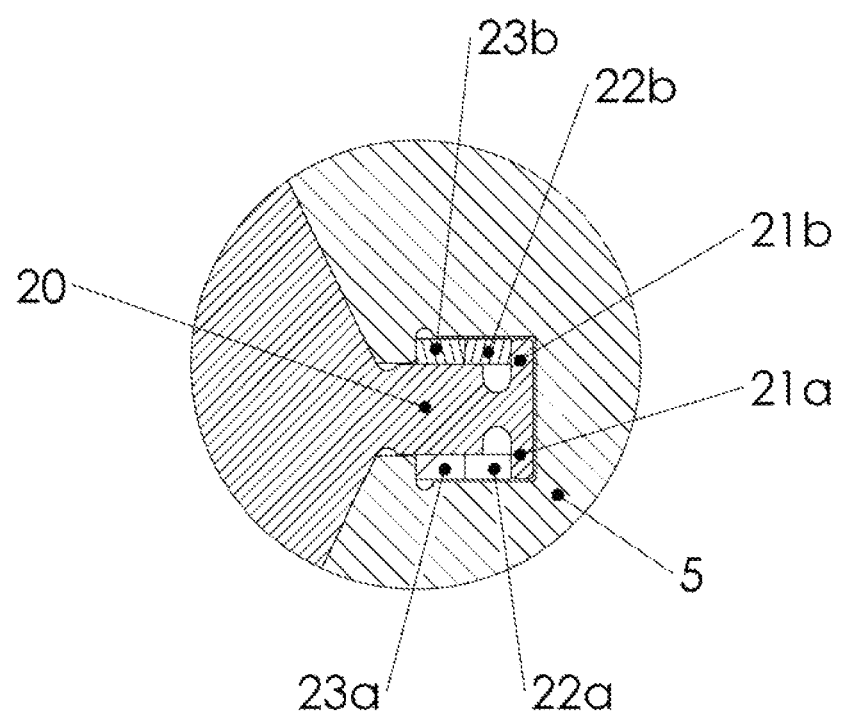
FIG. 6 is a detail view of the stator assembly shown in FIG. 5.

The tooth is preferably built with a bonded stack configuration where all of the laminations are glued together. The tooth 3 mates with the outer lamination 5 along angled surfaces 19a and 19b as shown in FIG. 5. The goal is to preload the tooth on these two angled surfaces such that the forces of the motor do not separate these surfaces. To accomplish this, a retention feature 20 is included to preload these surfaces. This retention feature 20 is shown in more detail in FIG. 6 where there are two tabs 21a and 21b that are built as part of this feature. Wedges 22a, 22b, 23a, and 23b are driven in from the end to deform tabs 21a and 21b and preload surfaces 19a and 19b. Wedges are preferably made of non-magnetic material to reduce eddy current losses. The best material choice would be an austenitic stainless steel, 300 series stainless steel for example. To manufacture wedges easily and to fit the feature in the limited space available, wedges can be made out of sheet metal. This means that the width of the wedge pair 22a and 23a for instance would be small compared to the combined thickness of the wedges as best shown in FIG. 6. The wedges in FIG. 6 show an example where the combined thickness is approximately 3.7 times the width.

The location of this retention feature is important for magnetic flux reasons. Teeth dimensions are preferably designed in such a way to not unacceptably saturate the iron but keep the tooth width as small as possible. The magnetic flux travels from the tooth across surfaces 19a and 19b into the outer lamination portion 5. It is important to design this retention feature out of the flux path which limits its location to outside of the two cylinders shown by the two circles 18a and 18b in FIG. 5. All the cutouts in the outer lamination 5 to accommodate retention feature 20 are located outside of these two cylinders. These cylindrical exclusion volumes have a diameter equal to the width of the tooth and their axes are at the junction of the tooth side 3a and 3b and the inside diameter of the outer lamination 5a and 5b. The angled surfaces 19a and 19b are angled to accommodate this flux plus mechanically center the tooth when preload is applied through tabs 21a and 21b. Ideally the surfaces 19a and 19b have an angle between them of 100-170 degrees.

There are other features that may want to fall in the good sector outside circles 18a and 18b as shown in FIG. 5. These could be notches 13a and 13b on the exterior of outer lamination 5. These notches could function as a space for a recessed weld or space for cooling air to recirculate inside the machine.

Figure 7:
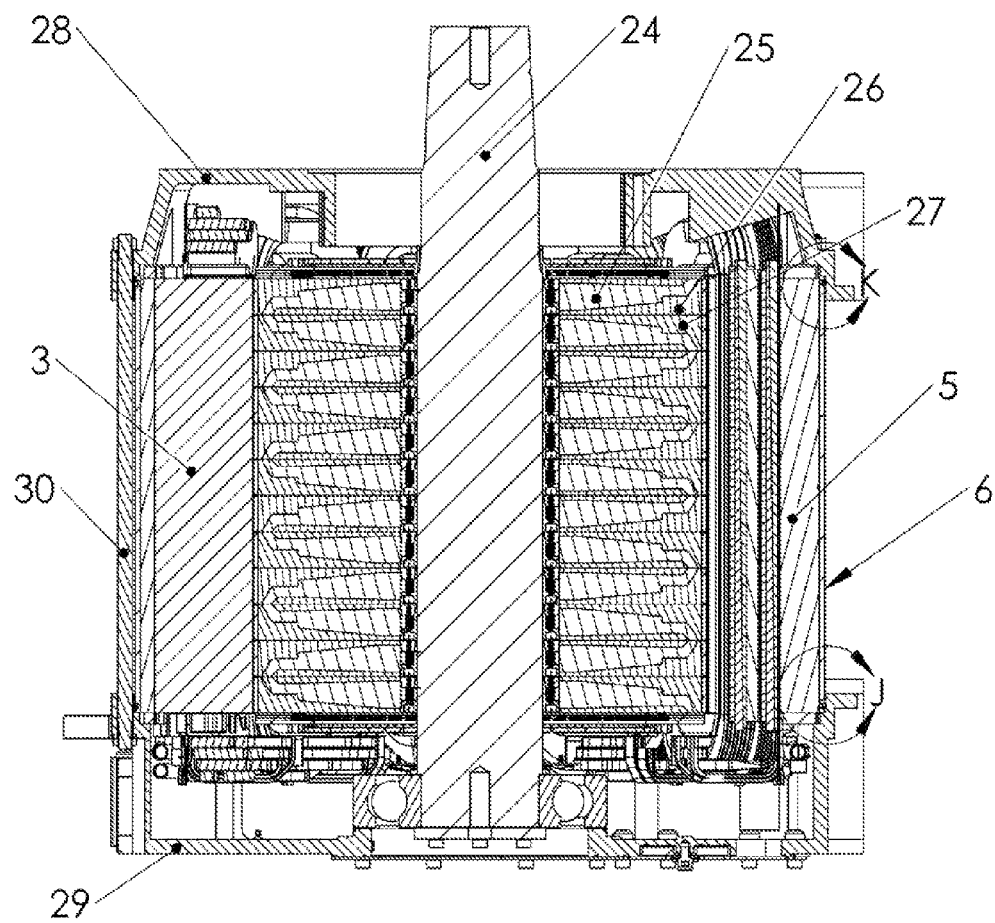
FIG. 7 is a cross sectional view showing motor/generator assembly.
Figure 8:
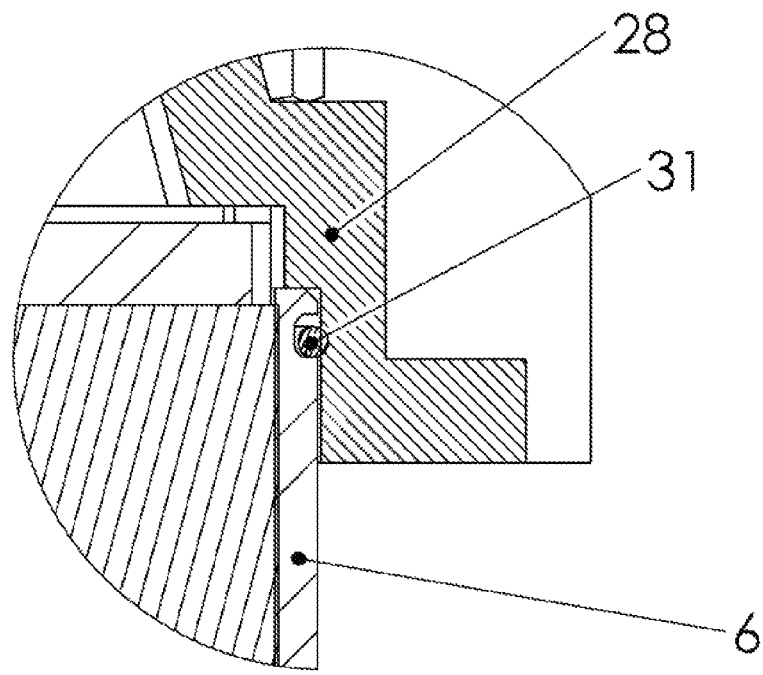
FIG. 8 is two detail views of the motor/generator assembly shown in FIG. 7.
Figure 8:
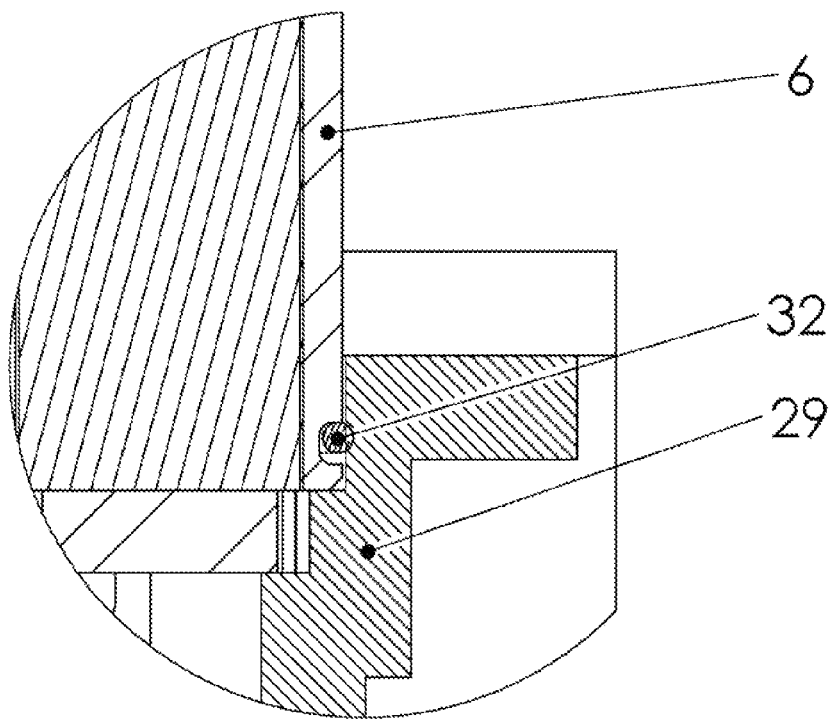

FIG. 7 shows an entire motor assembly that includes the stator assembly shown in FIG. 1. The rotor configuration is showing magnets 25 and tab pole plates 26 and 27. This rotor configuration is the same as shown in the two U.S. patent application Ser. No. 13/438,792 entitled HIGH EFFICIENCY PERMANENT MAGNET MACHINE WITH SEPARATED TAB POLE ROTOR AND STACKED CERAMIC MAGNET SECTIONS and Ser. No. 13/438,803 entitled SHAFT ATTACHMENT MEANS FOR HIGH EFFICIENCY PERMANENT MAGNET MACHINE WITH SEPARATED TAB POLE ROTOR both filed on Apr. 3, 2012, and each incorporated herein by reference. Outer tube 6 is preferably shrunk fit onto outer lamination 5 to mechanically align as well as transmit torque. The outer tube is compressed between drive side endplate 28 and non-drive side endplate 29 using threaded tie bars 30. The friction between outer tube and endplates transmits the torque to the machine mounting features. Alignment of shaft 24 is controlled through outer tube 6, endplates 28 and 29 and through bearings on each end. Sealing of the system can be accomplished by adding an O-ring seal 31 and 32 as shown in FIG. 8.

Figure 9:
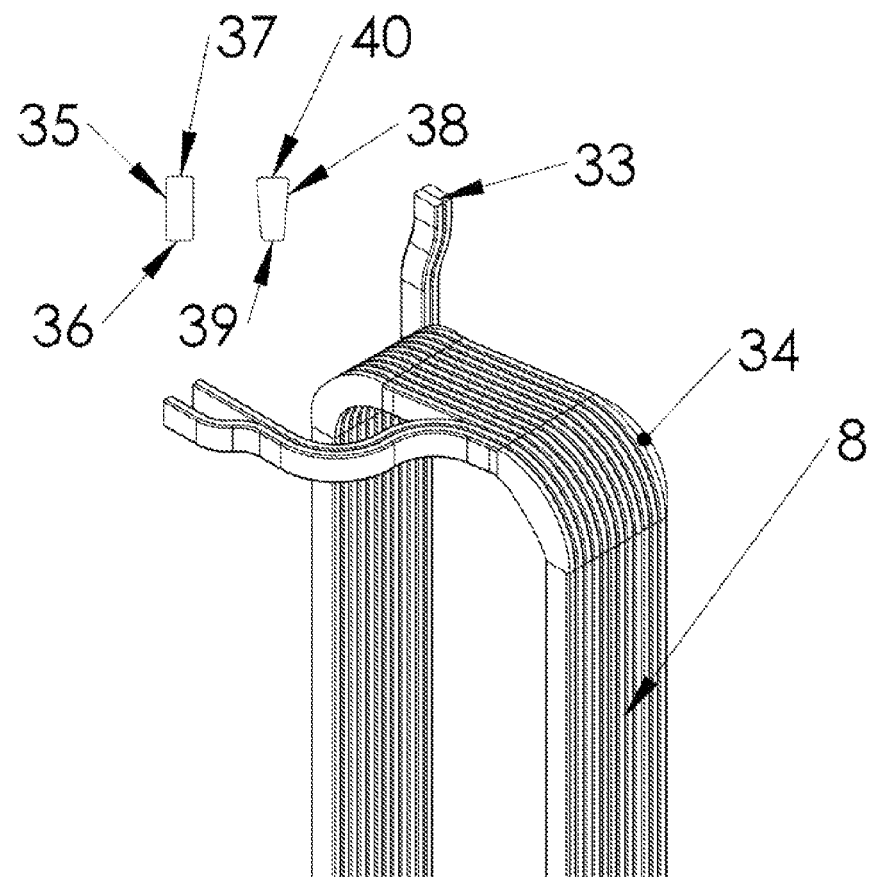
FIG. 9 is a view of the inner coil from the stator assembly of FIG. 1 and also shows a cross section of the rectangular wire and the rectangular wire that has been shaped into a keystone shape.

The inner coil 8 is shown in detail in FIG. 9. This coil is edge wound because the width of the wire is narrower than the thickness in the direction the wire is bent around the stator tooth. When wire is bent it tends to form a keystone shape in the corner areas. As shown in FIG. 9, when wire is in shape of a rectangle 35 with the mandrel side 37 and the outside edge 36, it forms a keystone shape 38 and the mandrel side 40 grows in width and the outside edge 39 contracts in width. The fact that wires always want to keystone when bent is why the coils bulge out in the corners as shown by 34. Limiting the amount of the keystone is important for overall packaging and can be controlled in the manufacturing process if the right process is used. The coil shown is two in hand wound (two wires wound simultaneously) with wires side by side 33. Depending on the specific design it may make sense to have single wire, two in hand or more than two in hand.

Figure 10:
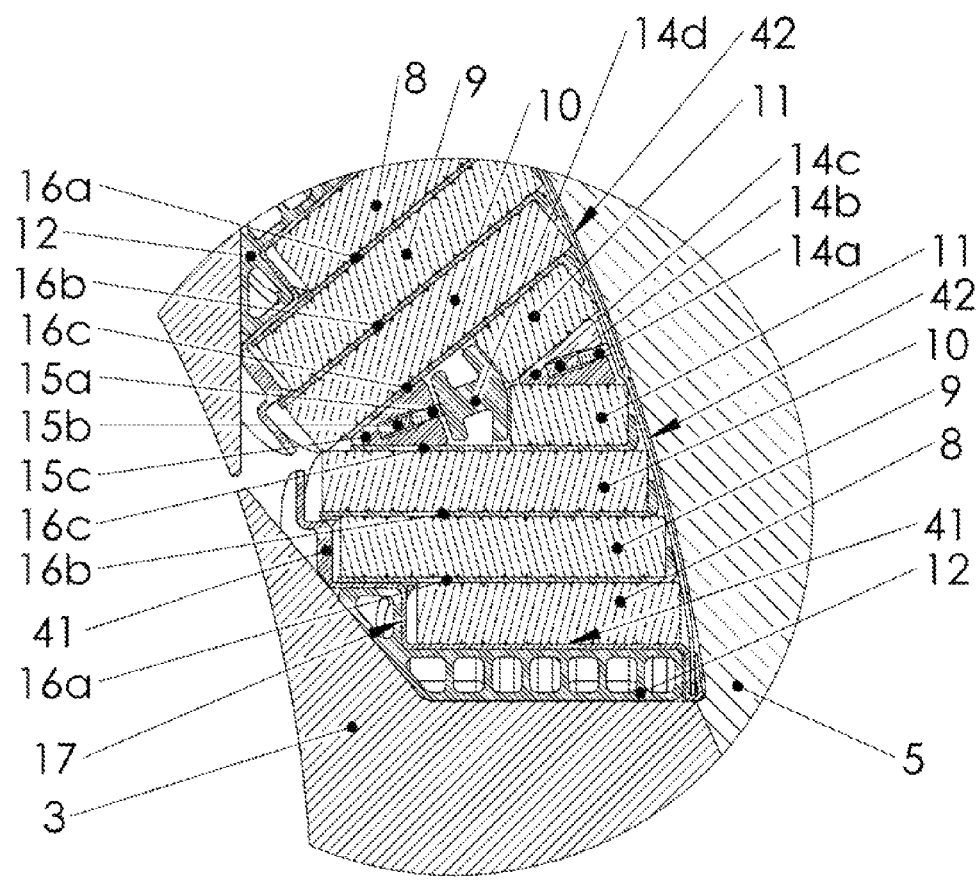
FIG. 10 is a detail view of the stator assembly shown in FIG. 4.

It is important for to have the wire thermally connected to the cooling manifold 12 as shown in FIG. 10. The cooling manifold is electrically isolated from the windings 8, 9, 10, 11, and by plastic insulator layer 41 that functions as ground insulation. Each of the winding layers is compressed towards cooling manifold 12. This is accomplished by wedge assemblies 14a,14b,14c;15a,15b,15c; and wedge block 14d which push the windings up against each other through insulators 16a,16b, 16c; against the insulation layer 41; and ultimately against cooling manifold 12. The first wedge assembly functions by driving tapered wedge 14a and 14b against each other in the cutout of 14c. The second wedge assembly functions by driving tapered wedge 15a and 15b against each other in the cutout of 15c against the wedge block 14d. There is a slot liner insulation 42 that acts as ground insulation between the wires and the outer lamination 5. This insulation is not directly in the path so thermal conductivity is not critical.

Insulators 41,16a, 16b, and 16c are directly in the path of heat transfer so thermal conductivity is critical. Further, due to the higher heat fluxes generated with more compact machines of this type, the thermal conductivity is even more critical. This can be accomplished by some combination of making it thin and using high thermal conductivity material. It is desired to have at least a thermal conductivity of 1 W/mK and preferably a conductivity of 3 W/mK and ideally a conductivity of 10 W/mK. Since this material also needs to be an electrical insulator to act as primary insulation, metals typically do not work. To function as primary insulation, electrical resistivity needs to be greater than 1000 Ohm cm and preferably greater than 10^15 Ohm cm. Plastics typically have thermal conductivities less than 1 W/mK, but there are some plastics such as those made by Coolpoly in Rhode Island USA that achieve this combination of properties.

Materials such as Liquid Crystal Polymer (LCP) and Polyphenylene Sulfide (PPS) make good choices due to their heat stability, but need to have special fillers to achieve high thermal conductivity.

The wire layers are preferably pre-insulated to minimize the thermal insulation with maximum electrical insulation. Wire is available with many grades of insulation with one or multiple coated layers. Polyamide-imide and Polyester are common material used for some of these layers with the Polyamide-imide typically as the outer layer to have good abrasion resistance.

Figure 11:
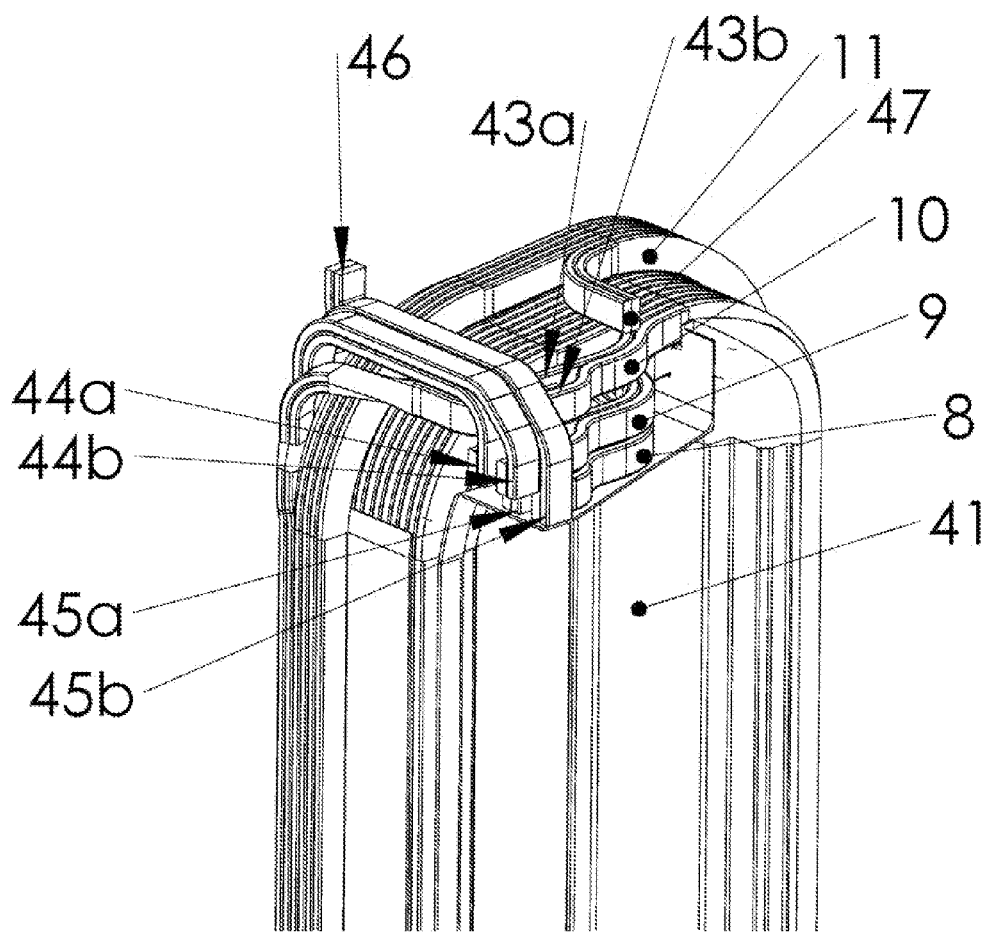
FIG. 11 is a three dimensional view of an assembly with 4 coils and the insulator of the stator assembly of FIG. 1.

The coils are preferably individually wound and then connected together after assembly. An assembly of the 4 coils and the plastic insulator is shown in FIG. 11. The inner coil 8 is electrically connected to the $2^{nd}$ coil 9 at location 45a and 45b. This joint can be soldered, brazed or mechanically connected. The $2^{nd}$ coil 9 is electrically connected to the $3^{rd}$ coil 10 at location 44a and 44b. The $3^{rd}$ coil 10 is electrically connected to the $4^{th}$ coil 11 at location 43a and 43b. All 4 coils are therefore connected in series with the functional entire coil starting at location 46 on the first coil and ending at location 47 on the $4^{th}$ coil. It is important to note that each of the strands of the wire is individually connected for reducing eddy current losses. Also, the configuration shown causes the furthest radial member of one coil to be connected to the closest radial member of the next coil. This is also done for eddy current reasons. This should be done for at least one of the coil connections, but here is shown at all 3 coil connections.

It is possible to do similar connections with more or less than 4 layers. In an alternative configuration, the coils can be connected electrically in parallel to reduce the size of wire required. If this is done, it is important to match the impedance of the parallel coils.

Figure 12:
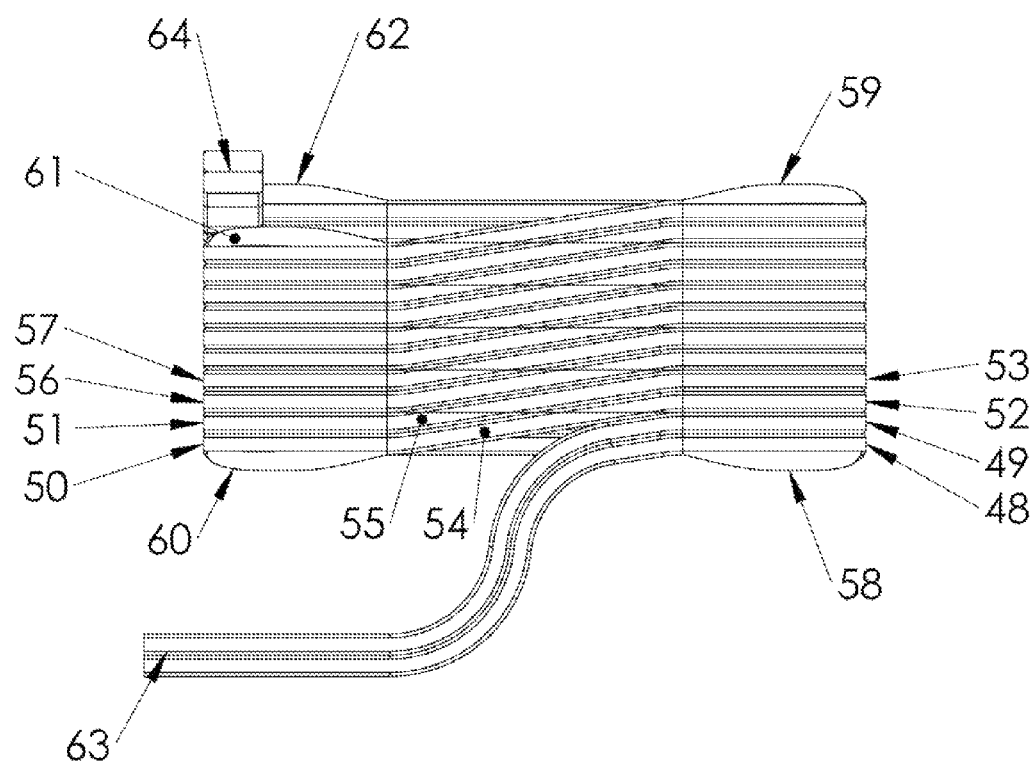
FIG. 12 is a top view of the inner coil of FIG. 9.
Figure 13:
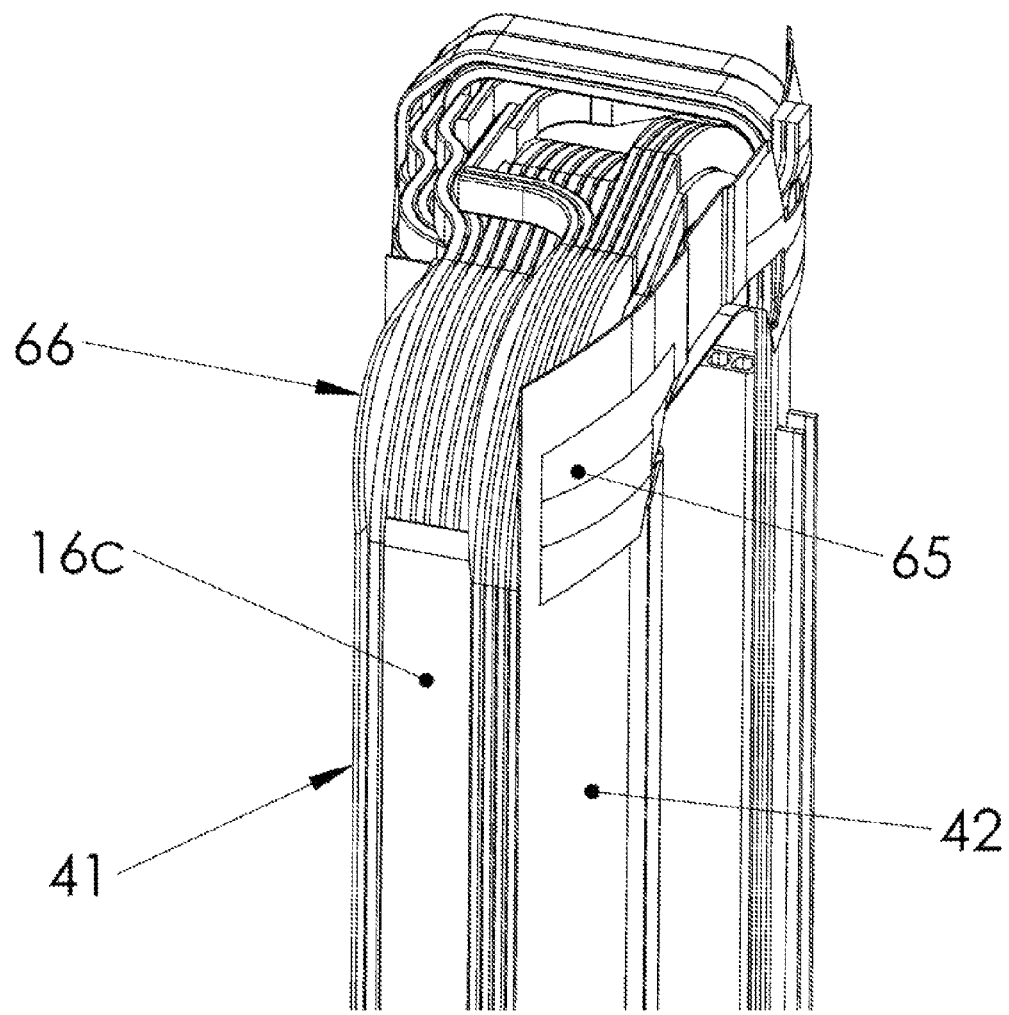
FIG. 13 is a three dimensional view of the coils and insulator of FIG. 11 with an added slot liner.

Particular geometry of the winding is important to maximize the amount of wire that can fit in the slot and maximize the thermal conductivity between the wire and cooling manifold. To have the coils sit flat it is important to keep a configuration as shown in FIG. 12. The first wrap 48 and 49 is planar with the other side of the first wrap 50 and 51. This wrap then crosses over 54 and 55 to the second wrap 52 and 53 on only one edge of the coil. The first side of the second wrap 52 and 53 is planar with the other side of the second wrap 56 and 57. Ideally this crossover 54 and 55 is done on the same end of the coil as the terminations 63 and 64 are done. The keystoning of the bends causes the coil to have bulges on the corners 58, 59, 60, 61, and 62. These bulges can be accommodated since they are located axially beyond the stator laminations. Bumps 65 can be added to the slot liner insulation 42 and Bumps 66 can be added to insulation 41 on other side as shown in FIG. 13.

Figure 14:
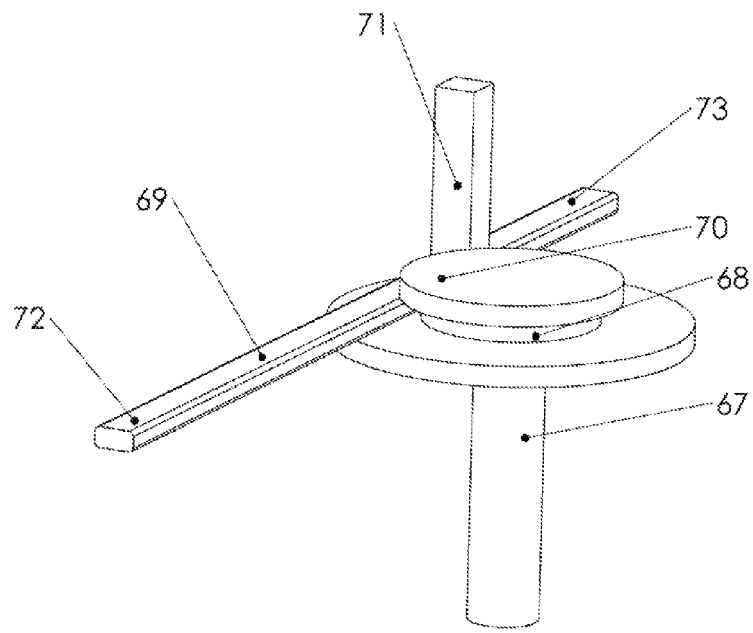
FIG. 14 is a three dimensional view of an edge winding machine before wire is bent.
Figure 15:
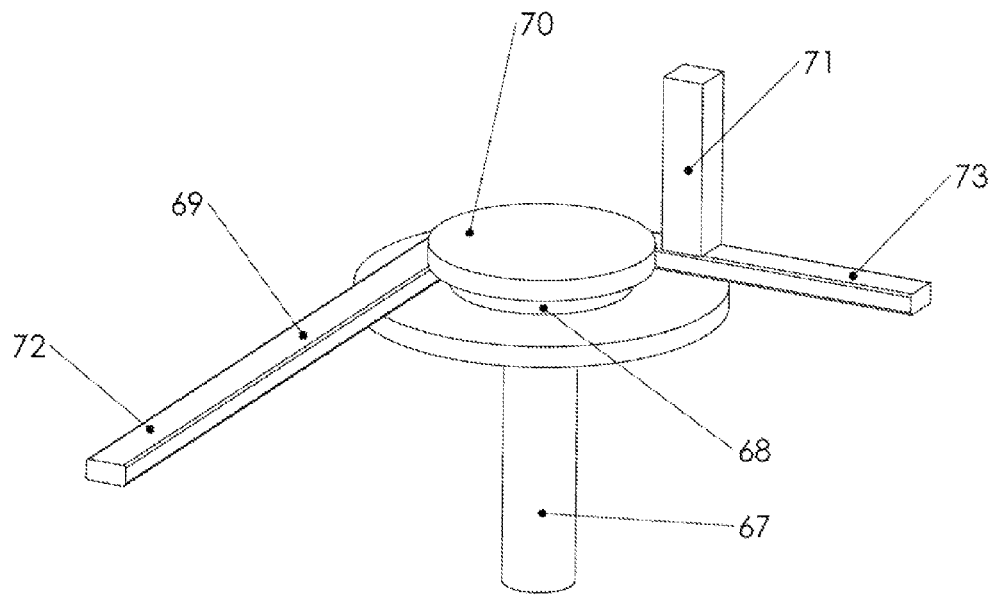
FIG. 15 is the edge winding machine of FIG. 14 after the wire is bent 90 degrees.
Figure 16:
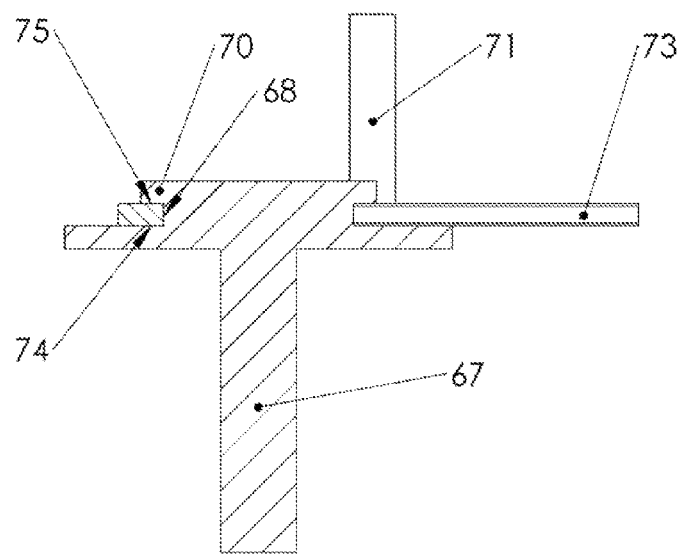
FIG. 16 is a cross sectional view of the edge winding machine of FIG. 15.

The winding process to edge wind pre-insulated wire and minimize keystoning in the corners is critical. As shown in FIG. 14 a rectangular wire 69 is clamped by clamp 71 to spindle 67 against mandrel 68. Width is constrained by edge guide 70. Spindle 67, clamp 71, and edge guide 70 are all fixed with respect to each other and rotate together. The spindle is rotated in a clockwise direction as viewed from above to form wire around the mandrel. Preferably there would be controlled tension on wire end 72 during the bend as shown in FIGS. 14 and 15. This controlled tension allows the neutral bending plane location to be controlled. More tension moves the neutral bending plane toward the mandrel 68. While the wire is being bent the wire is controlled between surfaces 74 and 75 as shown in FIG. 16. Fairly tight clearance should be maintained between the wire and these surfaces to minimize keystoning. Note the edge guide 70 that controls the wire along surface 75 extends at least past the neutral bending surface, approximately half way up the wire thickness. This bending is preferably done with pre-insulated wire to optimize the process. Additional bends can be made up unclamping the wire, rotating the spindle back to the previous position, extending the wire the correct amount, and then re-clamping the wire and repeating the process. When completing more than 360 degrees of bends, the wire can be guided up to sit on top of (vertically up along axis of spindle) the wire being bent. End termination, special features, and truing up the stack can be completed once the winding is complete.

Figure 17:
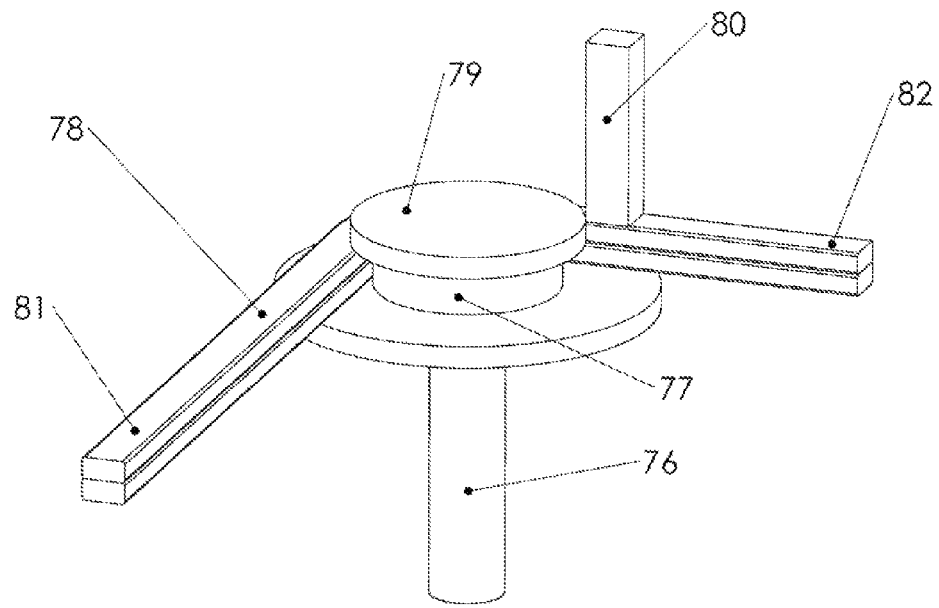
FIG. 17 is a three dimensional view of an edge winding machine winding 2 wires in hand.
Figure 18:
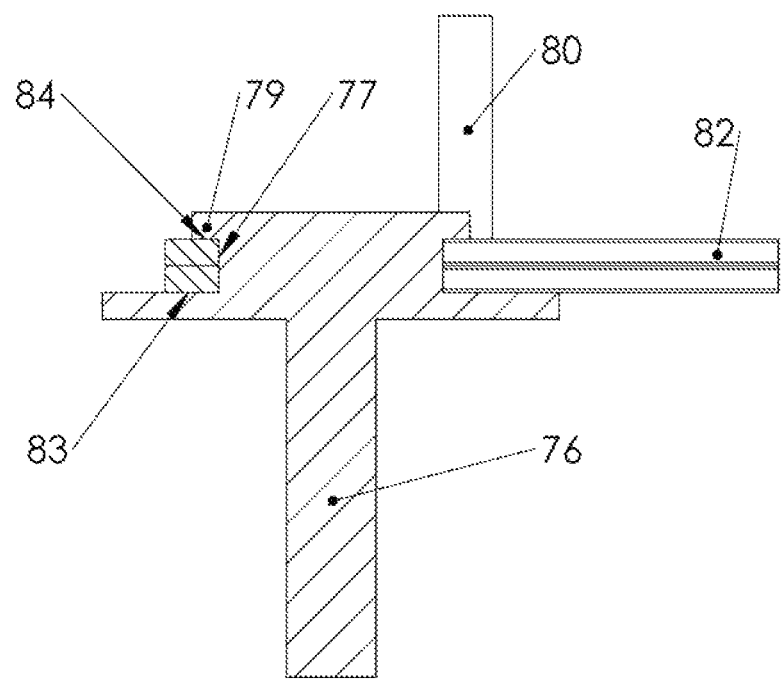
FIG. 18 is a cross section view of the edge winding machine of FIG. 17.

A very similar winding process can be used to edge wind multiple in hand wires that are pre-insulated with minimizing keystoning in the corners. As shown in FIG. 17, two in hand rectangular wire 78 is clamped by clamp 80 to spindle 76 against mandrel 77. Width is constrained by edge guide 79. Spindle 76, clamp 80, and edge guide 79 are all fixed with respect to each other and rotate together. Spindle 76 is rotated in a clockwise direction as viewed from above to form wire around mandrel. After it is bent 90 degrees the wire 69 would now be bent as shown in FIG. 15. Preferably there would be controlled tension on wire end 81 during the bend as shown in FIG. 17. This controlled tension allows the neutral bending plane location to be controlled. More tension moves the neutral bending plane toward the mandrel 77. While the wire is being bent the wire is controlled between surfaces 83 and 84 as shown in FIG. 18. Fairly tight clearance should be maintained between the wire and these surfaces to minimize keystoning. Note the edge guide 79 that controls the wire along surface 84 extends at least past the neutral bending surface, approximately half way up the wire thickness.

The overall process of building this stator assembly consists of

1) Creating the edge wound coil as described above,

2) Assembling the tooth assembly that consists of multiple edge wound coils, cooling manifolds, laminated teeth, and electrical insulation in various locations,
3) Compressing the wires together and against the cooling manifolds and holding them together in a fixture,
4) Inserting this assembly into the lamination stack including driving wedges to lock teeth into the stator lamination and driving wedges to push wire tight against cooling manifolds,
5) Any required fluid or electrical interconnections that are completed prior to Vacuum Pressure Impregnation (VPI),
6) Vacuum Pressure Impregnation (VPI) of the stator assembly.

The invention claimed is:

1. A rotary electric machine comprising:
a stator having a circumferentially spaced series of axially extending discrete teeth defining a similar series of circumferentially spaced winding slots therebetween, and
a plurality of stator coils wound around each tooth in a concentric manner so as to be at least partially disposed in each winding slot, each of said stator coils being configured and wound as a concentrated winding, wherein each winding includes at least two coils with an edge wound construction and which are concentric about the same tooth in the circumferential direction.

2. A rotating electric machine as set forth in claim 1 wherein a cooling manifold is located circumferentially between each tooth and said windings wound on that tooth.

3. A rotating electric machine as set forth in claim 2 further comprising at least one pair of wedges that compress the windings against the cooling manifold.

4. A rotating electric machine as set forth in claim 2 further comprising an insulation layer between the cooling manifold and the windings that is at least partially comprised of a material having a thermal conductivity of at least 1 W/mK.

5. A rotating electric machine as set forth in claim 1 wherein each of the coils is built as a separate unit and then electrically connected together in the assembly.

6. A rotating electric machine as set forth in claim 5 wherein at least two wires are simultaneously wound in a side-by-side manner to form each coil and connections between adjacent coils are made separately on each wire strand and insulated from each other.

7. A rotating electric machine as set forth in claim 6 wherein each wire is insulated prior to bending.

8. A rotating electric machine as set forth in claim 7 wherein the insulation contains at least one layer of polyamide-imide.

9. A rotating electric machine as set forth in claim 1 wherein for said coils, the wires on three sides of each turn are generally planar for at least some of the turns on said coil.

10. A rotating electric machine as set forth in claim 1 wherein at least some of the coils are connected electrically in parallel.

11. A rotating electric machine as set forth in claim 2 wherein said cooling manifold includes a step having a height approximately equal to a thickness of one coil layer.

12. A rotating electric machine as set forth in claim 1 further comprising at least one layer of insulation that separates the edge wound coils wound on a single tooth and has a thermal conductivity of at least 1 W/mK.

13. A method for building edge wound coils from at least one wire including a pre-applied electrical insulation layer and having a width, said method including
clamping the at least one wire into a spindle assembly comprising a spindle, edge guide, and clamp, the edge guide including a pair of parallel surfaces spaced apart a distance substantially equal to the width of the at least one wire to constrain the width of the at least one wire, the clamp pressing the at least one wire against the spindle; and then
rotating the spindle, edge guide, and clamp at the same time to create a bend in the at least one wire.

14. A method for building edge wound coils as set forth in claim 13 wherein said at least one wire comprises two or more strands of rectangular wire adjacent to each other and simultaneously bent together.

15. A method for building edge wound coils as set forth in claim 13 wherein wire tension is controlled while the spindle rotates.

16. A method for building stator assemblies from rectangular wire that comprises manufacturing a plurality of edge wound coils by clamping wire into a spindle assembly that constrains the width of the wire, rotating the spindle assembly to create a bend in the wire and repeating as many times as necessary; and nesting said coils inside each other as well as inserting cooling manifolds and stator teeth inside coils; clamping coils to nest tightly against said cooling manifolds; then inserting the winding assembly into the stator outside lamination and securing in place; completing any mechanical, fluid and electrical interconnections that are to be done before vacuum pressure impregnation, and then vacuum pressure impregnation of the stator assembly.

17. A method for building edge wound coils as set forth in claim 16 wherein the wire includes two or more strands of rectangular wire adjacent to each other.

18. A method for building edge wound coils as set forth in claim 16 wherein wire tension is controlled while the spindle rotates.

19. A method for building edge wound coils as set forth in claim 16 wherein said wire is pre-coated with electrical insulation.

20. A method for building edge wound coils as set forth in claim 16 wherein the coils are compressed together with wedges after insertion into the outside lamination.

21. A method for building edge wound coils as set forth in claim 16 wherein securing in place of said winding assembly includes driving at least one set of wedges in place.

22. A rotating electric machine as set forth in claim 2 wherein each cooling manifold abuts one of the teeth and one of the stator windings.

23. A rotating electric machine as set forth in claim 1 wherein the stator coils wound on each tooth includes portions stacked axially atop one another.

24. A method for building edge wound coils as set forth in claim 13, wherein the clamp includes a clamping surface for engaging the at least one wire that extends parallel to the parallel surfaces of the edge guide.

25. A method for building edge wound coils as set forth in claim 24, wherein the clamping surface for engaging the at least one wire lies in a plane that extends between the parallel surfaces.

26. A method for building edge wound coils as set forth in claim 13, wherein the at least one wire comprises multiple strands of rectangular wire held in the edge guide at the same time and simultaneously wound.

27. A method for building edge wound coils as set forth in claim 13, wherein the clamp presses the at least one wire against one of the parallel surfaces of the edge guide.

28. A method for building edge wound coils as set forth in claim 13, wherein the spindle is rotated about an axis, the clamp being positioned radially outward of at least one of the parallel surfaces of the edge guide.

29. A method for building edge wound coils as set forth in claim 13, wherein the spindle is rotated about an axis, the edge guide extending circumferentially about the axis.

30. A rotating electric machine as set forth in claim 1 wherein each of the stator coils is wound around only one tooth.

* * * * *